United States Patent
Holland

(10) Patent No.: US 10,138,732 B2
(45) Date of Patent: Nov. 27, 2018

(54) BLADE SHIELD REMOVAL AND REPLACEMENT

(71) Applicant: United Technologies Corporation, Farmington, CT (US)

(72) Inventor: Brian K. Holland, Mason, MI (US)

(73) Assignee: United Technologies Corporation, Farmington, CT (US)

( * ) Notice: Subject to any disclaimer, the term of this patent is extended or adjusted under 35 U.S.C. 154(b) by 180 days.

(21) Appl. No.: 15/194,028

(22) Filed: Jun. 27, 2016

(65) Prior Publication Data

US 2017/0370223 A1  Dec. 28, 2017

(51) Int. Cl.

| B32B 38/10 | (2006.01) |
| F01D 5/00 | (2006.01) |
| F01D 5/14 | (2006.01) |
| F04D 29/32 | (2006.01) |
| F04D 29/38 | (2006.01) |
| B23P 15/02 | (2006.01) |
| B23P 15/04 | (2006.01) |
| B32B 43/00 | (2006.01) |

(52) U.S. Cl.
CPC ............ *F01D 5/005* (2013.01); *F01D 5/147* (2013.01); *F04D 29/324* (2013.01); *F04D 29/38* (2013.01); *B23P 15/02* (2013.01); *B23P 15/04* (2013.01); *B32B 38/10* (2013.01); *B32B 43/006* (2013.01); *F05D 2220/32* (2013.01); *F05D 2220/36* (2013.01); *F05D 2230/10* (2013.01); *F05D 2230/23* (2013.01); *F05D 2230/70* (2013.01); *F05D 2230/80* (2013.01); *F05D 2230/90* (2013.01); *F05D 2240/303* (2013.01); *F05D 2300/121* (2013.01); *F05D 2300/133* (2013.01); *F05D 2300/603* (2013.01)

(58) Field of Classification Search
CPC ....... B32B 38/10; B32B 43/006; F01D 5/005; B23P 15/02; B23P 15/04; Y10T 156/1911; Y10T 156/1153
USPC .................................. 156/711, 712
See application file for complete search history.

(56) References Cited

U.S. PATENT DOCUMENTS

| 3,275,295 A | 9/1966 | Caldwell |
| 4,664,600 A | 5/1987 | Perry |
| 4,667,906 A | 5/1987 | Suarez |
| 4,802,828 A | 2/1989 | Rutz |
| 5,674,370 A | 10/1997 | DuPree |

(Continued)

FOREIGN PATENT DOCUMENTS

WO  WO 2016041957 A1 * 3/2016 ............. F01D 5/005

OTHER PUBLICATIONS

Northern Composites, "Breathers & Bleeders", available from <http://northerncomposites.com/partners/nci/breathers-bleeders > on May 2, 2016.

(Continued)

*Primary Examiner* — Mark A Osele
*Assistant Examiner* — Nickolas R Harm
(74) *Attorney, Agent, or Firm* — O'Shea Getz P.C.

(57) ABSTRACT

Aspects of the disclosure are directed to milling a nose of a first shield of a blade to leave at least one strip of the first shield coupled to a blade body, subsequent to the milling, applying a cryogenic technique to the blade to weaken a bond between the first shield and the blade body, and subsequent to the applying of the cryogenic technique, removing the at least one strip of the first shield from the blade body.

19 Claims, 5 Drawing Sheets

(56) References Cited

U.S. PATENT DOCUMENTS

| | | | |
|---|---|---|---|
| 5,782,607 A | | 7/1998 | Smith |
| 5,881,972 A | | 3/1999 | Smith |
| 6,939,487 B1 | * | 9/2005 | Ajello ................. B29C 37/0003 |
| | | | 264/2.6 |
| 8,449,784 B2 | | 5/2013 | Parkos |
| 8,800,145 B2 | | 8/2014 | Mukherji |
| 9,157,327 B2 | | 10/2015 | Deal |
| 2011/0182741 A1 | | 7/2011 | Alexander |
| 2012/0152893 A1 | | 6/2012 | Parkos et al. |
| 2014/0013599 A1 | | 1/2014 | Guo |
| 2015/0026980 A1 | | 1/2015 | Tellier et al. |
| 2015/0059183 A1 | * | 3/2015 | Neumann ............. B23P 11/025 |
| | | | 29/898.08 |
| 2015/0086376 A1 | * | 3/2015 | Fandrei, II ................ F01D 5/28 |
| | | | 416/224 |
| 2015/0132140 A1 | * | 5/2015 | Haag ..................... F03D 1/0675 |
| | | | 416/224 |
| 2015/0144271 A1 | * | 5/2015 | Fujita .................... B32B 43/006 |
| | | | 156/701 |
| 2015/0204193 A1 | * | 7/2015 | Anasis .................... F01D 5/005 |
| | | | 29/889.1 |
| 2015/0218953 A1 | | 8/2015 | Bottome |
| 2016/0003062 A1 | | 1/2016 | Murdock |
| 2017/0252896 A1 | | 9/2017 | Gascher et al. |

OTHER PUBLICATIONS

Northern Composites, "Release Films", available from <http://www.northerncomposites.com/partners/nci/release-film> on May 2, 2016.
EP search report for EP17178206.3 dated Oct. 27, 2017.

* cited by examiner

BLADE SHIELD REMOVAL AND REPLACEMENT

BACKGROUND

Gas turbine engines, such as those which power aircraft and industrial equipment, employ a compressor to compress air that is drawn into the engine via a fan and a turbine to capture energy associated with the combustion of a fuel-air mixture. Various components of the engine may be subject to wear over the operational lifetime of the engine. For example, in an aerospace application the engine may ingest stones, hail, animals (e.g., birds), etc., that may degrade the structural integrity of a component of the engine. The degradation may render the component inoperable and/or may impact the performance/efficiency of the engine.

One of the components of an engine is a fan blade. The fan blade is manufactured to include a sheath/shield at an axial, leading edge of the fan blade. The shield is coupled to a fan blade body/substrate via an epoxy adhesive. The shield helps protect the blade against erosion. The shield also provides strength/resistance to the blade in relation to potential impact with objects, such as the ingested objects described above. However, the shield's presence at the leading edge of the fan blade also makes the shield particularly susceptible to wear. If the wear is significant enough (e.g., if the wear is in an amount that is greater than a threshold), the shield may need to be removed and replaced.

Conventional techniques for removing a shield from the blade body include application of an instrument (e.g., a putty knife) to remove the adhesive that couples the shield to the blade body. While effective, the use of the instrument may have a tendency to compromise the integrity of the blade body. Another technique that is used in the removal of the shield is to submerge the blade in a chemical solution bath. The chemical solution compromises/attacks the adhesive, thereby separating the shield from the blade body. However, the chemical solution is only effective where the chemical interfaces with the adhesive; experience suggests that a blade may need to be submerged in the bath on the order of twenty hours before the shield is separable from the blade body. Accordingly, what is needed is a more efficient and effective technique for removing a shield from a blade body.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a method comprising: milling a nose of a first shield of a blade to leave at least one strip of the first shield coupled to a blade body, subsequent to the milling, applying a cryogenic technique to the blade to weaken a bond between the first shield and the blade body, and subsequent to the applying of the cryogenic technique, removing the at least one strip of the first shield from the blade body. In some embodiments, the applying of the cryogenic technique includes applying dry ice to the at least one strip. In some embodiments, the applying of the cryogenic technique compromises an adhesive disposed between the first shield and the blade body. In some embodiments, the at least one strip includes at least two strips. In some embodiments, the removing of the at least one strip from the blade body includes prying or cutting the at least one strip using an instrument. In some embodiments, the instrument includes a knife. In some embodiments, the first shield is coupled to the blade body via an adhesive, and the method further comprises: removing residual adhesive from the blade body subsequent to the removal of the at least one strip from the blade body. In some embodiments, the method further comprises preparing the blade body to receive a second shield subsequent to the removal of the at least one strip from the blade body. In some embodiments, the preparing includes applying a solvent to the blade body. In some embodiments, the preparing includes applying a primer to the blade body and curing the primer. In some embodiments, the preparing includes applying an adhesive to the blade body. In some embodiments, the method further comprises coupling a second shield to the blade body subsequent to the removal of the at least one strip from the blade body. In some embodiments, the second shield corresponds to the first shield after the first shield has been subjected to conditioning or repair. In some embodiments, the second shield is different from the first shield. In some embodiments, the method further comprises applying a heat blanket to the second shield and bonding the second shield to the blade body subsequent to the applying of the heat blanket. In some embodiments, the method further comprises applying a vacuum bag to the second shield and bonding the second shield to the blade body subsequent to the applying of the vacuum bag. In some embodiments, the method further comprises installing the blade as part of an engine subsequent to the coupling of the second shield to the blade body. In some embodiments, the blade is installed as part of a fan section of the engine. In some embodiments, the blade is installed as part of a compressor section of the engine. In some embodiments, at least one of the blade body or the shield includes at least one of a composite material, aluminum, or titanium.

BRIEF DESCRIPTION OF THE DRAWINGS

The present disclosure is illustrated by way of example and not limited in the accompanying figures in which like reference numerals indicate similar elements. The drawings are not necessarily drawn to scale unless specifically indicated otherwise.

DETAILED DESCRIPTION

Figure 1:
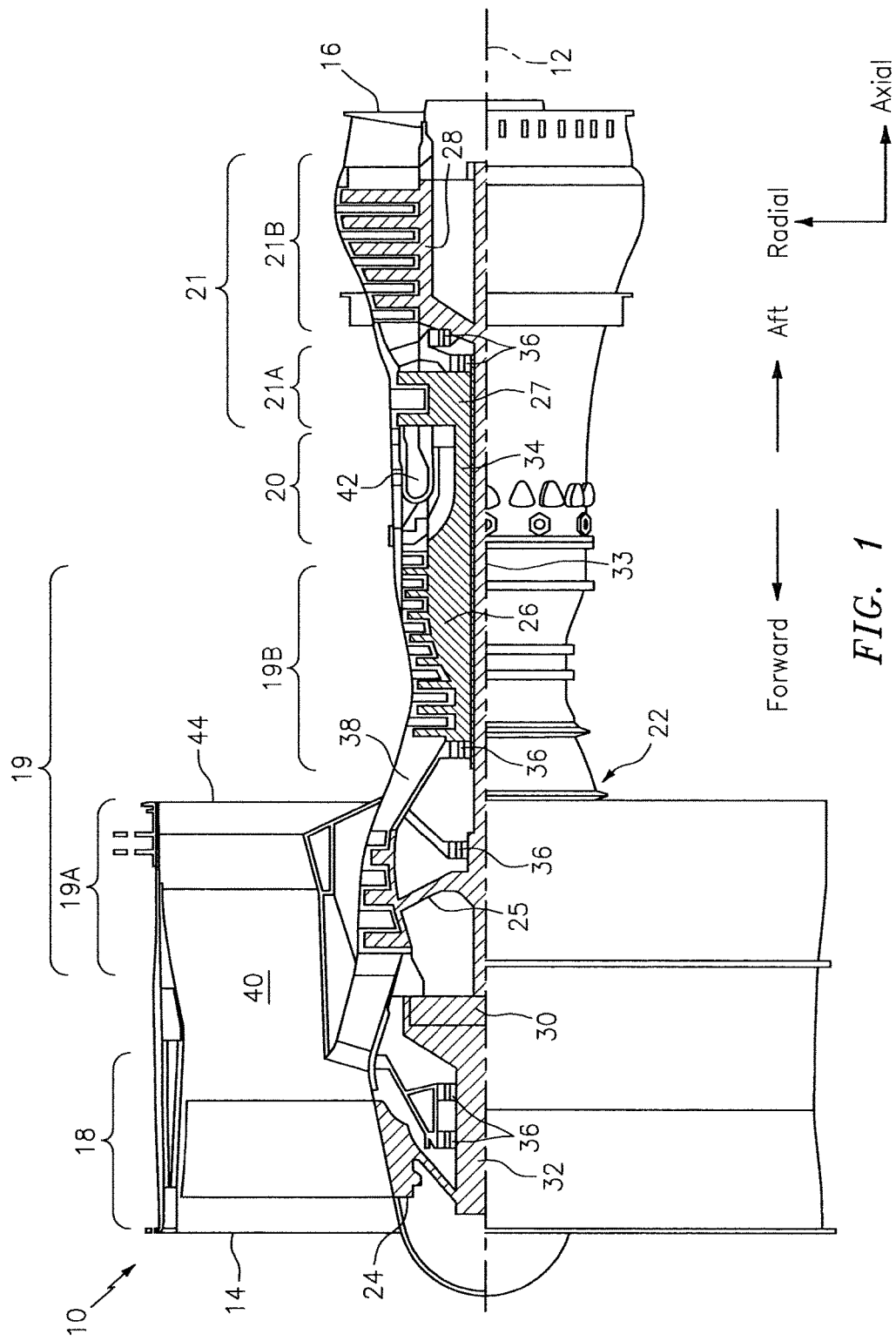
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with aspects of the disclosure, apparatuses, systems, and methods are directed to a blade of an engine, such as for example a fan blade. The blade may include a shield located on a leading edge of a substrate/body of the blade, where the leading edge may be defined relative to a forward, axial reference direction of the engine. The shield may be removed from the body of the blade using one or more techniques. For example, a milling technique and a cryogenic technique may be used in some embodiments to remove the shield from the body.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 2A:
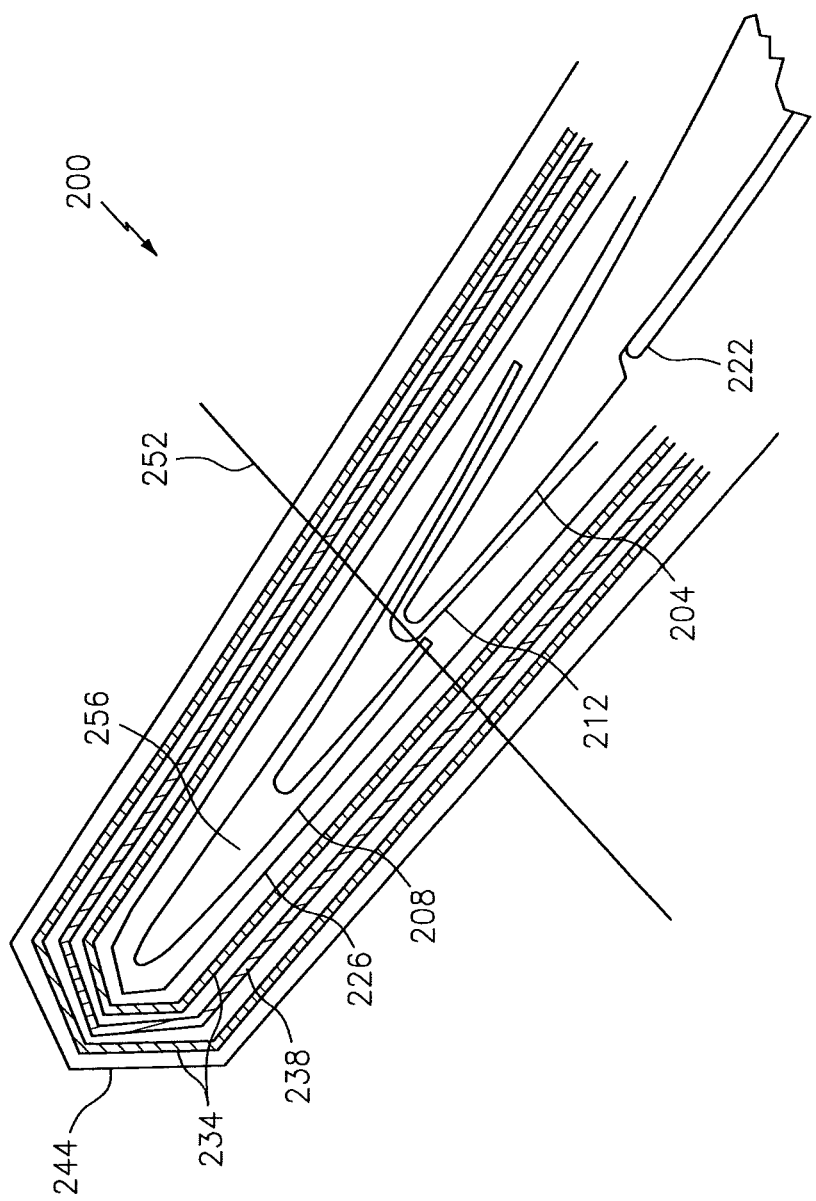
FIG. 2A illustrates a cross-sectional view of a system incorporating a blade in accordance with aspects of this disclosure.

Referring to FIG. 2A, a system 200 is shown. The system 200 may be used in the conjunction with a replacement of a shield associated with a blade, where the manufacture and use of the shield would be known to one of skill in the art as described above.

The system 200 is shown as including a blade body 204. The blade body 204 may be coupled to a shield 208. The shield 208 may be located at a leading edge of the blade body 204, where the leading edge may be specified with respect to a forward, axial reference direction associated with an engine (e.g., engine 10 of FIG. 1). The shield 208 may be coupled to the blade body via an adhesive 212, such as for example an epoxy adhesive. In this respect, the adhesive 212 may be disposed between the blade body 204 and the shield 208.

The system 200 may include a cover 222. The cover 222 may be coupled to (e.g., bonded on) the blade body 204. The cover 222 may provide protection with respect to one or more cavities that may be incorporated in the blade (e.g., the blade body 204); for example, the cover 222 may prevent any unwanted material or debris from entering the cavities.

The system 200 may include a release film 226. The release film 226, illustratively shown in FIG. 2A as being disposed between the shield 208 and a first, inner layer breather cloth 234, may serve as a separator to keep, e.g., the shield 208 and the breather cloth 234 from sticking together. The release film 226 may be sourced from one or more providers, such as for example Northern Composites, Inc. of Hampton, N.H.

The system 200 may include a breather cloth 234. The breather cloth 234 may be implemented as one or more layers. For example, a first layer of the breather cloth 234 may be disposed between: (1) the shield 208/release film 226 and (2) a heat blanket 238. A second, outer layer of the breather cloth 234 may be disposed between (1) the heat blanket 238 and (2) a vacuum bag 244. The particular ordering of the layers is illustrative; other arrangements may be used. Furthermore, while two layers of breather cloth 234 are shown in FIG. 2A, any number of layers of breather cloth 234 may be used in some embodiments. As one skilled in the art would appreciate, a breather cloth 234 is typically a lightweight blanket used in vacuum bag 244 bonding process. The breather cloth 234 may be sourced from one or more providers, such as for example Northern Composites, Inc. of Hampton, N.H. The role of the heat blanket 238 and the vacuum bag 244 in the context of the system 200 is described below in relation to FIG. 3.

Figure 2B:
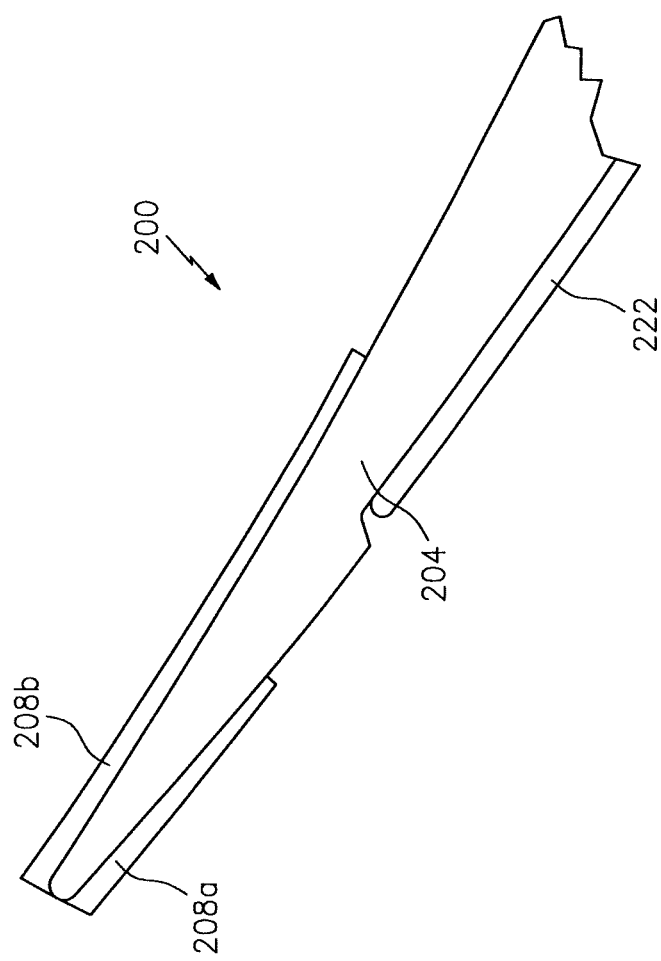
FIG. 2B illustrates the system of FIG. 2A after a portion of a shield has been removed from the blade.
Figure 2C:
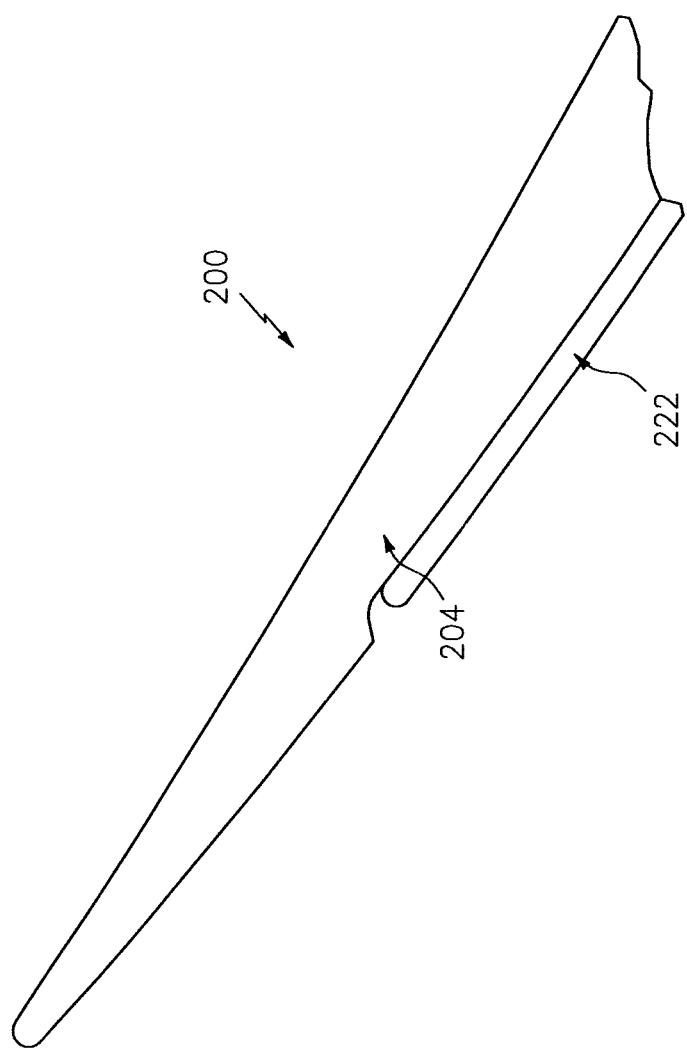
FIG. 2C illustrates the system of FIG. 2B after material strips of the shield have been removed from the blade.
Figure 3:
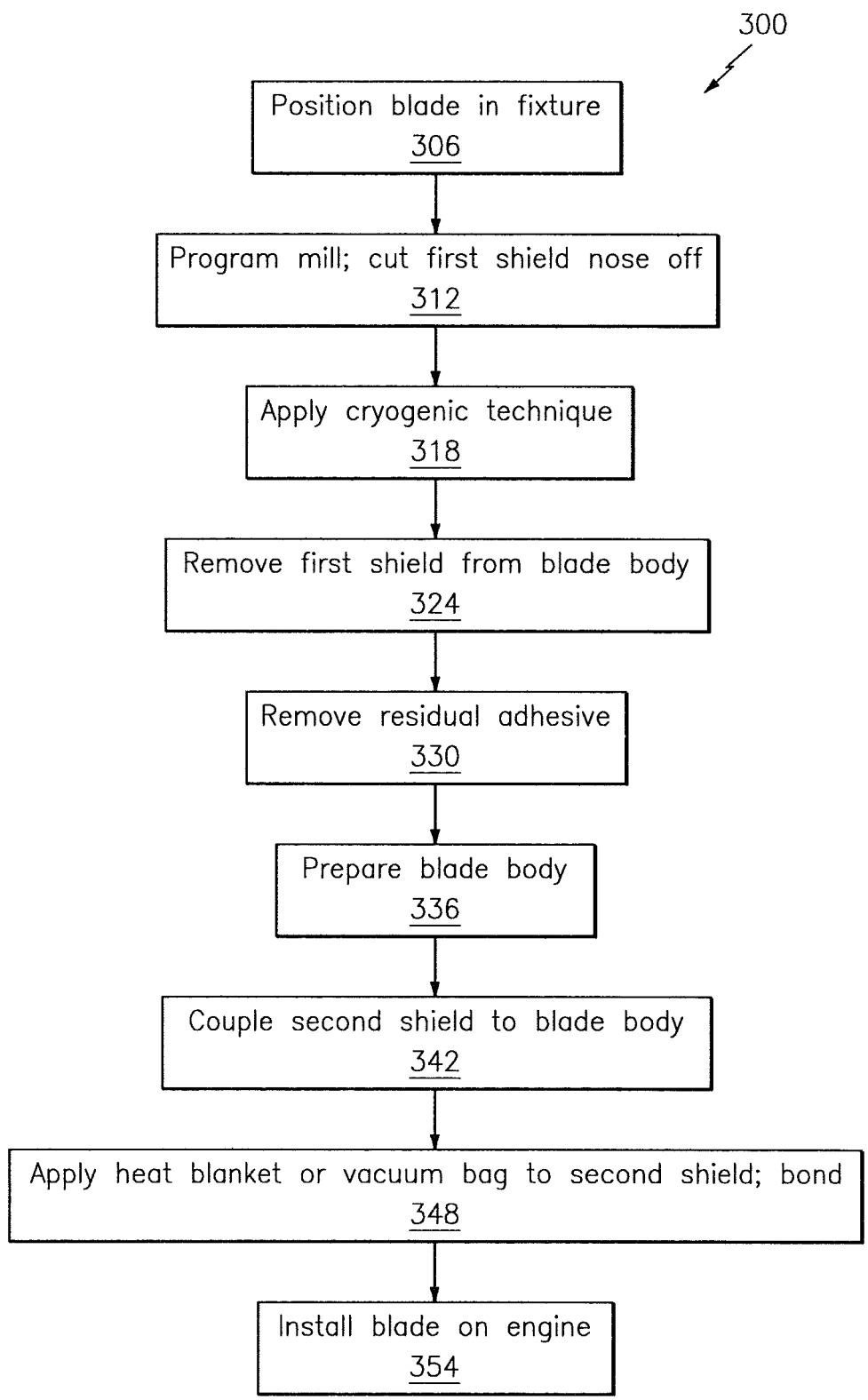
FIG. 3 illustrates a flow chart of a method used to remove and replace a shield of a blade in accordance with aspects of this disclosure.

Referring to FIG. 3, a flow chart of a method 300 is shown. The method 300 may be used to remove a shield from a blade body of a blade. The method 300 is described below in relation to FIGS. 2A-2C for illustrative convenience; one skilled in the art would appreciate that the method 300 may be adapted to accommodate other types of systems or components.

In block 306, the blade may be positioned in a tooling fixture. The fixture may constrain the blade relative to a mill. Stated somewhat differently, the fixture may ensure that the blade is oriented relative to an orientation of the mill.

In block 312, the mill may be programmed to make a cut at an interface (e.g., interface 252) between the first shield 208 and the blade body 204 along the length of the first shield 208. After the cut/mill is made, the forward portion/nose 256 of the first shield 208 may fall off, leaving strips of material 208a and 208b of the first shield 208 (see FIG. 2B). Cutting the nose 256 off facilitates/eases application of a cryogenic technique as described below by converting a three-dimensional bond-line shape to a two-dimensional shape.

In block 318, a cryogenic technique may be applied to the blade. For example, dry ice may be applied to the strips 208a and 208b. The dry ice may, in effect, penetrate the strips 208a and 208b and compromise the adhesive 212 by imposing stress/strain on an associated bond-line.

Application of the cryogenic technique may be effective within a couple of minutes (e.g., ten minutes), after which the first shield 208 may be easily removed from the blade body 204. For example, as part of block 324 an instrument (e.g., a hand tool, such as for example a putty knife) may be applied to pry/cut any remaining portions of the first shield 208 (e.g., the strips 208a and 208b) away from the blade body 204 (see FIG. 2C, where the strips 208a and 208b are removed relative to FIG. 2B). One skilled in the art would appreciate that the instrument may include a power tool or an automated device.

In block 330, any residual adhesive 212 that may remain on the blade body 204 may be removed. For example, as part of block 330 sandblasting (e.g., aluminum oxide sandblasting) or sandpaper (e.g., aluminum oxide sandpaper) may be applied to the blade body 204.

As part of block 336, one or more techniques may be applied to the blade body 204 in order to prepare the blade body 204 for bonding with a second shield 208. For example, as part of block 336 one or more solvents may be applied to the blade body 204. A primer may be applied to the blade body 204; the primer may be cured. Adhesive 212 may be (re)applied to the blade body 204.

In block 342, the second shield 208 may be coupled to the blade body 204. The second shield 208 may correspond to the first shield 208 that was removed as part of block 324 described above, potentially after the first shield 208 has been subjected to conditioning or repair. The second shield 208 may correspond to a new instance of a shield, e.g., the second shield 208 may be different from the first shield 208.

In block 348, the heat blanket 238 and/or a vacuum bag 244 may be coupled to, e.g., the second shield 208. Heat and pressure may be applied to the second shield 208 in relation to a bonding of the second shield 208 to the blade body 204. The heat blanket 238 and vacuum bag 244 may help to ensure that a service characteristic/parameter of the adhesive 212 is not exceeded/compromised during the bonding procedure.

In block 354, the blade may be removed from the fixture and installed as part of an engine. For example, as part of block 354 the blade may be installed as part of a fan section or a compressor section of the engine.

In some embodiments, a blade may be made from, or include, one or more materials. For example, a blade may be manufactured from a composite material, aluminum, titanium, etc.

Technical effects and benefits of this disclosure include an ability to reprocess/refurbish a cast/forged blade by removing a first heat shield from a blade body and coupling a second heat shield (which may be the same as, or different from, the first heat shield) to the blade body. Aspects of the disclosure may preserve the structural integrity of the blade body during a removal and replacement of a shield. Furthermore, aspects of the disclosure may be used to remove and replace a shield within a couple of minutes (e.g., fifteen minutes), thereby facilitating quick turn-around times for reprocessing/refurbishing a blade.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A method comprising:
    milling a nose of a first shield of a blade to leave at least one strip of the first shield coupled to a blade body;
    subsequent to the milling, applying a cryogenic technique to the blade to weaken a bond between the first shield and the blade body;
    subsequent to the applying of the cryogenic technique, removing the at least one strip of the first shield from the blade body;
    coupling a second shield to the blade body subsequent to the removal of the at least one strip from the blade body;
    applying a heat blanket to the second shield; and
    bonding the second shield to the blade body subsequent to the applying of the heat blanket.

2. The method of claim 1, wherein the applying of the cryogenic technique includes applying dry ice to the at least one strip.

3. The method of claim 1, wherein the applying of the cryogenic technique compromises an adhesive disposed between the first shield and the blade body.

4. The method of claim 1, wherein the at least one strip includes at least two strips.

5. The method of claim 1, wherein the removing of the at least one strip from the blade body includes prying or cutting the at least one strip using an instrument.

6. The method of claim 5, wherein the instrument includes a knife.

7. The method of claim 1, wherein the first shield is coupled to the blade body via an adhesive, and wherein the method further comprises:
    removing residual adhesive from the blade body subsequent to the removal of the at least one strip from the blade body.

8. The method of claim 1, further comprising:
    preparing the blade body to receive the second shield subsequent to the removal of the at least one strip from the blade body.

9. The method of claim 8, wherein the preparing includes:
    applying a solvent to the blade body.

10. The method of claim 8, wherein the preparing includes:
    applying a primer to the blade body; and
    curing the primer.

11. The method of claim 8, wherein the preparing includes:
    applying an adhesive to the blade body.

12. The method of claim 1, wherein the second shield is different from the first shield.

13. The method of claim 1, further comprising:
    applying a vacuum bag to the second shield; and
    the bonding of the second shield to the blade body is subsequent to the applying of the vacuum bag.

14. The method of claim 1, further comprising:
installing the blade as part of an engine subsequent to the coupling of the second shield to the blade body.

15. The method of claim 14, wherein the blade is installed as part of a fan section of the engine.

16. The method of claim 14, wherein the blade is installed as part of a compressor section of the engine.

17. The method of claim 1, wherein at least one of the blade body or the shield includes at least one of a composite material, aluminum, or titanium.

18. A method comprising:
milling a nose of a first shield of a blade to leave at least one strip of the first shield coupled to a blade body;
subsequent to the milling, applying a cryogenic technique to the blade to weaken a bond between the first shield and the blade body;
subsequent to the applying of the cryogenic technique, removing the at least one strip of the first shield from the blade body;
coupling a second shield to the blade body subsequent to the removal of the at least one strip from the blade body;
applying a vacuum bag to the second shield; and
bonding the second shield to the blade body subsequent to the applying of the vacuum bag.

19. A method comprising:
coupling a second shield to a blade body subsequent to a removal of at least one strip of a first shield from the blade body;
applying at least one of a heat blanket or a vacuum bag to the second shield; and
bonding the second shield to the blade body subsequent to the applying of the at least one of a heat blanket or a vacuum bag.

* * * * *